3,067,108
METHOD OF REFINING AMYLOGLUCOSIDASE
Thomas L. Hurst and Almerin Willard Turner, Decatur, Ill., assignors to A. E. Staley Manufacturing Company, Decatur, Ill., a corporation of Delaware
No Drawing. Filed Feb. 15, 1961, Ser. No. 89,349
13 Claims. (Cl. 195—31)

This invention relates to refining amyloglucosidase preparations to remove carbohydrate-synthesizing enzymes therefrom, e.g., isomaltose synthetase and maltose transglucosidase, whereby the refined enzyme can hydrolyze starch and its intermediate hydrolysis products more extensively to glucose.

The amyloglucosidase preparations contemplated by this invention are derived from molds and bacteria, generally by submerged fermentation, but by other techniques also. The enzyme preparation is generally in the form of a filtered or centrifuged fermentation beer, but it may have other forms. Among these are: (1) the whole fermentation mixture or culture including the microorganism, (2) dried whole culture, (3) dried fermentation beer, (4) aqueous extract of dried whole culture, and (5) a concentrated dried material obtained by precipitating the starch-hydrolyzing enzyme from the filtered or centrifuged fermentation beer with a dehydrating agent, such as acetone or ethanol.

The principal starch-hydrolyzing enzyme in the preparations contemplated by this invention has been given several different names. Among these are gamma amylase, glucamylase, starch glucogenase, maltase, and amyloglucosidase. The enzyme is distinguished from other starch-hydrolyzing enzymes by its property of hydrolyzing starch to glucose unaccompanied by the concurrent formation of substantial amounts of low molecular weight intermediate hydrolytic products, such as maltose, maltotriose, higher sugars, and soluble dextrins. The enzyme appears to function by removing glucose units one at a time starting at the nonreducing end of a starch chain. The enzyme also hydrolyzes maltose, maltotriose, and other intermediate hydrolytic products of starch to glucose.

Examples of genera of microorganisms which can be cultured by known methods to yield whole fermentation mixtures and fermentation beers containing commercially attractive concentrations of amyloglucosidase are Aspergillus, Mucor, Clostridium, and Rhizopus. The following sub-genera are good producers of amyloglucosidase: *Aspergillus oryzae, Clostridium acetobutylicum, Rhizopus delemar, Aspergillus niger, Aspergillus phoenicis,* and *Aspergillus flavus.*

The preparation of amyloglucosidase in the form of whole cultures and fermentation beers is described in United States Patents 2,557,078; 2,881,115 and 2,893,921. Purification of a crude amyloglucosidase preparation, the water extract of *Rhizopus delemar,* is described at pages 3359–3365, volume 73 of the Journal of the American Chemical Society.

We have observed that amyloglucosidase preparations produced according to the foregoing United States patents are unable to hydrolyze starch or starch-derived substrate completely to glucose. At commercially feasible initial concentrations of starch-derived substrate, the graph of the amyloglucosidase hydrolysis, wherein the ratio of the weight of glucose formed to the weight of hydrolyzate dry substance is plotted as ordinate against hydrolysis time as abscissa, either levels off at about 0.86 or "peaks" at about that value and then declines. The numerical value of D at the leveling off or peak region is referred to hereinafter as the glucogenic activity of the amyloglucosidase composition, where D is the percent by weight of glucose in the total solids. Attention is called to the fact that the glucogenic activity of an amyloglucosidase preparation has no necessary connection with the unit potency of the composition as determined according to United States Patent 2,881,115.

In the manufacture of crystalline glucose by the amyloglucosidase hydrolysis of starch and its intermediate hydrolytic products, as described in United States Patents 2,531,999; 2,567,000 and 2,583,451, and as suggested in United States Patent 2,881,115, it is generally desirable to obtain the highest possible conversion or hydrolysis of starchy substrate to glucose. High degree of hydrolysis facilitates the crystallization of glucose from the concentrated hydrolyzate because the non-glucose hydrolysis products (maltose, isomaltose, higher sugars and dextrins) inhibit the glucose crystallization. Also, high degree of hydrolysis increases the yield of glucose while decreasing the yield of often unwanted mother liquor solids. Although useful enzyme processes for the manufacture of crystalline glucose from starch and intermediate starch hydrolyzates can be based on the prior art amyloglucosidase preparations, those processes would obviously be improved if the enzyme preparations were capable of hydrolyzing the substrate to glucose to a substantially greater extent, i.e., if the glucogenic activities of the enzyme preparations were greater.

We have discovered a simple inexpensive method for treating the prior art amyloglucosidase preparations to increase their glucogenic activities significantly. Starchy substrates hydrolyzed with prior art amyloglucosidase preparations treated by our method show 90–95 D by analysis, instead of the usually lower values averaging about 86 D. According to our method, an aqueous solution or dispersion of the amyloglucosidase preparation is mixed with a small proportion of a new refining agent to selectively precipitate or inactivate the undesirable or contaminating carbohydrate-synthesizing enzymes. Generally, the selective inactivation is produced or accompanied by a precipitation or coagulation of the undesired enzymes, but the desired inactivation may occur without precipitation. Also, the inactivation, with or without a precipitation, is not reversed afterward by moderately increasing the temperature and pH of the mixture of amyloglucosidase preparation and refining agent. Accordingly, the mixture may be used, without separating liquor from any precipitate, to hydrolyze starch and its intermediate hydrolysis products to glucose. If desired, however, any precipitate may be separated from the liquor, which contains the amyloglucosidase in solution, and the clarified liquor then used to hydrolyze starch or starch-derived substrate to glucose. Alternatively, either the clarified or unclarified aqueous amyloglucosidase preparation may be concentrated, evaporated to dryness, or dehydrated with a water-miscible organic liquid, such as acetone or ethanol, prior to use.

The amyloglucosidase preparation, prior to treatment with the refining agent, may contain material insoluble in water, but its contents of amyloglucosidase and interfering carbohydrate-synthesizing enzymes dissolve in the aqueous medium of our process and are available for reaction with the refining agent. Usually, and preferably, the amyloglucosidase preparation is in the form of a filtered or centrifuged fermentation beer, i.e., a clear, though colored, aqueous solution. Our process is applicable, however, to amyloglucosidase preparations in the form of aqueous solutions of the enzymes containing suspended insoluble material, e.g., whole fermentation culture.

Water is the preferred reaction medium in our method, but small proportions of other liquids, such as acetone, ethanol, ethyl acetate, and glycerol, may be present in the medium.

As mentioned above, it appears that our treatment inactivates one or more carbohydrate synthesizing enzymes from the original amyloglucosidase preparation, and that maltose transglucosidase is among the enzymes thus inactivated. The character and functioning of maltose transglucosidase are described by Pan et al. (Arch. Biochem. Biophys. 42, 421–434) and by Pazur and French (J. Biol. Chem. 196, 265–272).

We have found that several different surface active agents among the sulfonated higher alcohols and alkylated aromatic sulfonic acids are selective refining agents according to our invention. The di-2-ethylhexyl ester of orthophosphoric acid is also effective. Either the free acid, or a water-soluble salt thereof, may be used according to our invention. The sodium salt of the acid is a preferred form, but other water-soluble salts are equally effective. Among such salts are those of lithium, potassium, ammonia, lower alkyl amines and quaternary ammonium hydroxides. The free acids suitable in our method are represented by the following structural formulae:

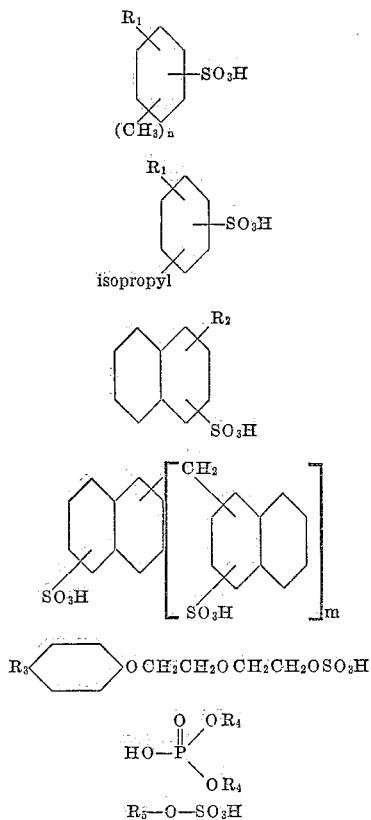

In the above formulae, $R_1$ is an alkyl radical of 10–15 carbon atoms, $R_2$ is an alkyl radical of 3–5 carbon atoms, $R_3$ may be either $CH_3-C-(CH_3)_2-CH_2-C(CH_3)_2-$ or $CH_3-C(CH_3)_2-CH_2-C(CH_3)_2-CH_2-C(CH_3)_2-$, $R_4$ is 2-ethylhexyl, $R_5$ is an alkyl radical of 14–18 carbon atoms, $n$ is an integer ranging from 0 to 2, and $m$ is an integer ranging from 1 to 6.

Methods by which the foregoing sulfonic acids and sulfuric acid esters may be prepared are discussed in chapters 3 and 5 of Surface Active Agents—Their Chemistry and Technology by A. M. Schwartz and J. W. Perry, 1949 edition, Intersicence Publishers, Incorporated. The di-2-ethylhexyl ester of orthophosphoric acid may be made by known methods.

Specific examples of acids embraced by the foregoing structural formulae are: monokeryl benzene monosulfonic acid wherein the keryl substituent is an alkyl group averaging about 15 carbon atoms derived from a highly saturated kerosene, monodecyl benzene monosulfonic acid, monopentadecyl benzene monosulfonic acid, monokeryl toluene monosulfonic acid, monokeryl xylene monosulfonic acid, monokeryl cumene monosulfonic acid, monoisopropyl naphthalene monosulfonic acid, monoisoamyl naphthalene monosulfonic acid, the acid ester of sulfuric acid and 7-ethyl-2-methyl-4-undecanol, and the acid ester of sulfuric acid and 3,9-diethyl-6-tridecanol.

In our method, the refining agent is preferably first dissolved in water to form a solution of moderate concentration, e.g., 5–10% by weight of the material, and then a suitable quantity of the solution is quickly mixed with the aqueous amyloglucosidase preparation to be purified. The concentration of the solution is not critical, however, and values above and below the 5–10% range may be used if desired. Alternatively, the refining agent in a dry or pure form may be stirred into the aqueous amyloglucosidase preparation. A solution is preferred because this reduces the likelihood of precipitating or inactivating some of the amyloglucosidase by local high concentration of refining agent as it is added to the amyloglucosidase preparation.

The refining agents useful in our method have a pH plateau of maximum effectiveness ranging from about 4 pH downward to values of 2 and less. Their effectiveness decreased rapidly with increasing treatment pH above 4 pH and is vanishingly small at about 5 pH. Owing to the sensitivity of amyloglucosidase to low pH values, particularly at about 3 pH and below, the preferred treatment pH in our method is the upper range of the abovementioned plateau, i.e., 3–4 pH. Also, it is desirable, when carrying out our method at the lower pH values, to keep the temperature down (e.g., 20° C. or less) to reduce loss of amyloglucosidase by pH inactivation.

The preferred temperature of our method, at the preferred pH of 3–4, is 20°–40° C. Lower temperatures down to the freezing point of the preparations may be used, if desired, but the cost and inconvenience of providing the lower temperature more than offsets the gain of a slightly reduced loss of amyloglucosidase due to pH inactivation. Temperatures above 40° C. are operative with respect to precipitating or inactivating the undesirable enzymes, but values in excess of 55–60° C. are undesirable because they lead to temperature inactivation of the amyloglucosidase. The temperature control of our method is determined largely by the freezing of the aqueous amyloglucosidase preparation on one hand, and by the inactivation of amyloglucosidase at elevated temperatures on the other hand. The selective precipitation or inactivation of undesired enzymes with the refining agent is only slightly influenced by temperature over the range of 0°–60° C.

The weight proportion of refining agent based on weight of aqueous amyloglucosidase preparation is fairly critical. We have found that the optimum proportion, for aqueous amyloglucosidase preparations containing from 10 to 150 units per milliliter, ranges from 0.05 to 0.1 part per 100 parts of the preparation. Below this range, the precipitation of impurities, i.e., the increase in glucogenic power, is diminished, and above this range some amyloglucosidase activity is lost, presumably by inactivation with the refining agent, without appreciable increase in glucogenic activity. The lower and upper useful limits of refining agent proportion in our method are, respectively, about 0.01 and 0.2 part by weight based on the aqueous amyloglucosidase preparation.

If aqueous amyloglucosidase preparations containing more than 150 units of amyloglucosidase per milliliter are to be refined by our method, the above-discussed weight proportions of refining agent should be increased proportionately.

The time required for the protein precipitant to increase significantly the glucogenic power of the amyloglucosidase preparation according to our invention is quite short. Apparently all that is needed is uniform distribution of the protein precipitant throughout the amyloglucosidase solution. We have found that 15–30 minutes of moderate agitation is adequate, but that shorter times are also effective.

Our method is applicable to the prior art amyloglucosidase preparations generally. Although the commercially attractive amyloglucosidase preparations are generally derived from the Aspergillus genus (*Aspergillus niger*, *Aspergillus oryzae*, *Aspergillus phoenicis*, and *Aspergillus flavus* in particular), our method is effective on amyloglucosidase preparations obtained by the culturing of other microorganisms including members of the Mucor, Clostridium and Rhizopus genera.

The following examples are illustrative embodiments of our invention.

*Example 1*

This example illustrates the application of our method to an amyloglucosidase preparation obtained by filtering the culture beer of an *Aspergillus phoenicis* fermentation performed as described in Example 1 of United States Patent 2,893,921. The amyloglucosidase potency of the filtered beer is 90 units per milliliter, as determined according to the method described at lines 29–41, column 2, of the patent. Into one liter of the filtered beer at 30° C. and 4 pH is stirred 10 grams of a 10% water solution of the sodium salt of monokeryl benzene monosulfonic acid. The mixture is adjusted to 3.5 pH with dilute hydrochloric acid, stirred for 30 minutes, then filtered through coarse filter paper. Aliquots of the original and treated beers are examined for ability to hydrolyze acid thinned corn starch paste or syrup as follows: 100 ml. aliquots of the thinned paste at 60° C. (30–35% solids by weight, 15 D.E., 4 pH, prepared by careful autoclaving of a 35% solids corn starch slurry at 1.9 pH with hydrochloric acid, cooling, and neutralizing to 4 pH with soda ash) are measured into several 4 ounce bottles and placed in an incubator at 60° C. Into each of half of the bottles is stirred 3.9 ml. of original broth and into each of the remaining bottles is stirred 4.2 ml. of the treated broth, a volume supplying the same number of units of amyloglucosidase as the 3.9 mls. of original broth. One each of the two sets of bottles is withdrawn from the incubator after 48 hours and analyzed for glucose by the glucose-oxidase method described at page 109 in volume 31 (1959) of Analytical Chemistry. This is repeated on separate pairs of bottles at 72, 96, and 120 hours' incubation. The analytical results are tabulated below:

| Incubation Time (Hours) | Glucose Content (Original Enzyme) | Glucose Content (Treated Enzyme) |
| --- | --- | --- |
| 48 | 86.0 | 89.3 |
| 72 | 85.7 | 91.1 |
| 96 | 86.2 | 94.2 |
| 120 | 86.7 | 94.9 |

When the foregoing example is repeated with the sole process variation of adjusting the pH of the treated beer to 2, 4, 5 and 6 in separate treatments, it is found that the treatment at 6 pH is substantially ineffective, i.e., the treated and original beers are substantially alike in their starch-hydrolyzing ability. It is also observed that appreciable amyloglucosidase potency is lost at 2 pH.

Repetition of Example 1 with the sole process variation of using 1, 5, 20, and 30 grams of the sulfonate solution in separate treatments shows that one tenth part by weight of sulfonate per 1,000 parts by weight of amyloglucosidase beer is about the lower limit of effectiveness, and that the amyloglucosidase potency of the treated beer is substantially reduced above 2 parts by weight of sulfonate per 1,000 parts by weight of beer.

*Example 2*

That part of Example 1 restricted to treatment at 3.5 pH with 0.1% coagulant is repeated except for replacing the monokeryl benzene monosulfonate with the sodium salt of monoisopropyl naphthalene monosulfonic acid. Comparative results are tabulated below:

| Incubation Time (Hours) | Glucose Content (Original Enzyme) | Glucose Content (Treated Enzyme) |
| --- | --- | --- |
| 48 | 86.0 | 87.7 |
| 72 | 85.7 | 89.8 |
| 96 | 86.2 | 90.6 |
| 120 | 86.7 | 91.9 |

*Example 3*

This example illustrates the use of a sulfonated higher alcohol to increase the glucogenic activity of an aqueous amyloglucosidase preparation obtained from *Aspergillus niger*. The mold is cultured according to the directions given at lines 4–23, column 4 of United States Patent 2,557,078. The filtered beer from the described culturing contains 60 units of amyloglucosidase per milliliter. The procedure of Example 1 is repeated except for replacing the monokeryl benzene monosulfonate with the sodium salt of the mono-3,9-diethyl-6-tridecanol ester of sulfuric acid, and changing the volumes of untreated and treated beers in the comparative tests to 5.8 and 6.0 milliliters, respectively. The comparative analytical results are tabulated below:

| Incubation Time (Hours) | Glucose Content (Original Enzyme) | Glucose Content (Treated Enzyme) |
| --- | --- | --- |
| 48 | 86.0 | 90.2 |
| 72 | 85.7 | 91.7 |
| 96 | 86.2 | 93.5 |
| 120 | 86.7 | 94.1 |

*Example 4*

This example illustrates our invention by the use of the di-2-ethylhexyl ester of orthophosphoric acid to refine an aqueous amyloglucosidase preparation obtained from *Aspergillus phoenicis* according to Example 1. That part of Example 1 restricted to treatment at 3.5 pH with 0.1% coagulant is repeated except for replacing the monokeryl benzene monosulfonate with the sodium salt of di-2-ethylhexyl ester of orthophosphoric acid. Comparative analytical results are tabulated below:

| Incubation Time (Hours) | Glucose Content (Original Enzyme) | Glucose Content (Treated Enzyme) |
| --- | --- | --- |
| 48 | 86.0 | 88.5 |
| 72 | 86.0 | 89.0 |
| 96 | 86.2 | 92.1 |
| 120 | 86.7 | |

*Example 5*

This example illustrates our invention by the use of a naphthalene monosulfonic acid-formaldehyde condensate to refine an aqueous amyloglucosidase preparation obtained from *Aspergillus phoenicis* according to Example 1. That part of Example 1 restricted to treatment at 3.5 pH with 0.1% coagulant is repeated except for replacing the monokeryl benzene monosulfonate with a sulfonated naphthalene formaldehyde condensate. Such condensates are commercially available, one example being a product distributed by the National Aniline Division of Allied Chemical Corporation under the trade name "Naccotan A." Comparative analytical results are tabulated below:

| Incubation Time (Hours) | Glucose Content (Original Enzyme) | Glucose Content (Treated Enzyme) |
|---|---|---|
| 48 | 86.0 | 88.4 |
| 72 | 86.4 | 91.6 |
| 96 | 86.2 | 92.5 |
| 120 | 87.2 | 93.2 |

*Example 6*

This example illustrates our invention by the use of an aryl-alkyl ether sulfonate to refine an aqueous amyloglucosidase preparation obtained from *Aspergillus phoenicis* according to Example 1. That part of Example 1 restricted to treatment at 3.5 pH with 0.1% coagulant is repeated except for replacing the monokeryl benzene monosulfonate with the sodium salt of a sulfuric acid monoester having the structure

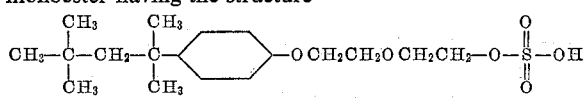

Comparative analytical results are tabulated below:

| Incubation Time (Hours) | Glucose Content (Original Enzyme) | Glucose Content (Treated Enzyme) |
|---|---|---|
| 48 | 86.0 | 87.3 |
| 72 | 85.7 | 88.1 |
| 96 | 86.2 | 89.0 |
| 120 | 86.7 | 89.6 |

*Example 7*

That part of Example 1 restricted to treatment at 3.5 pH with 0.1% coagulant is repeated except for replacing the solution of monokeryl benzene monosulfonate with 40 grams of a dilute sodium hydroxide solution containing 4 grams of purified lignin. The comparative analytical results are tabulated below:

| Incubation Time (Hours) | Glucose Content (Original Enzyme) | Glucose Content (Treated Enzyme) |
|---|---|---|
| 48 | 83.3 | 90.4 |
| 72 | 84.5 | 89.2 |
| 96 | 85.7 | 91.0 |
| 120 | 86.1 | 92.7 |

As used in the foregoing description and in the appended claims, the term "starch" includes: (1) any native starch, whether waxy or non-waxy, derived from root, stem or fruit of a vegetable, (2) the separate fractions (amylose and amylopectin) of non-waxy starches, and (3) any lightly modified starch whether modified by oxidation, acid treatment, derivatization or heat.

We claim:

1. The method of increasing the glucogenic activity of aqueous amyloglucosidase preparations that comprises mixing with the preparation at a pH in the range of 2 to 5 an effective amount of an amyloglucosidase-refining agent selected from the group consisting of (1) acids having the structural formulae

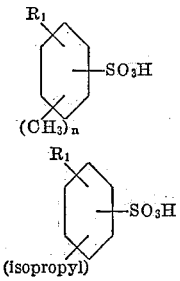

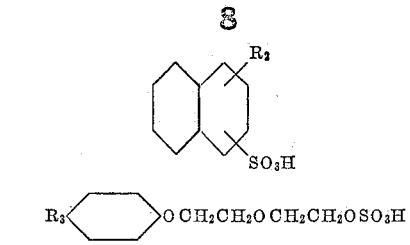

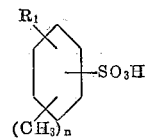

wherein $R_1$ is an alkyl radical of 10–15 carbon atoms, $R_2$ is an alkyl radical of 3–5 carbon atoms, $R_3$ is an alkyl radical selected from the group consisting of $$CH_3C(CH_3)_2CH_2C(CH_3)_2—$$

and $CH_3C(CH_3)_2CH_2C(CH_3)_2CH_2C(CH_3)_2—$, $R_4$ is 2-ethylhexyl, $R_5$ is an alkyl radical of 14–18 carbon atoms, $n$ is a number selected from the group consisting of 0, 1, 2 and 3 and $m$ is an integer ranging from 1 to 6 and (2) water-soluble salts of said acids, said amount being a small proportion sufficient to selectively inactivate at least a major part of any carbohydrate-synthesizing enzymes present without inactivating any substantial part of the amyloglucosidase present.

2. The method of increasing the glucogenic activity of aqueous amyloglucosidase preparations that comprises mixing with the preparation at a temperature in the range of 0° to 60° C. and at a pH in the range of 2 to 5 an effective amount of an amyloglucosidase-refining agent selected from the group consisting of (1) acids having the structural formulae

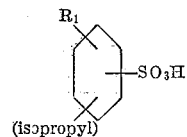

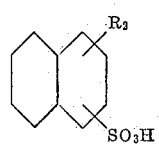

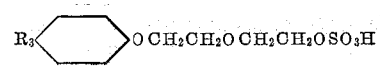

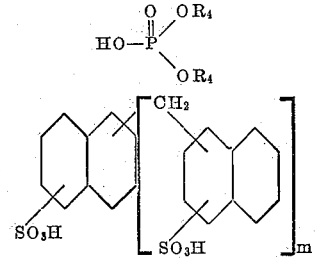

$$R_5-O-SO_3H$$

wherein $R_1$ is an alkyl radical of 10–15 carbon atoms, $R_2$ in an alkyl radical of 3–5 carbon atoms, $R_3$ is an alkyl radical selected from the group consisting of $$CH_3C(CH_3)_2CH_2C(CH_3)_2-$$

and $CH_3C(CH_3)_2CH_2C(CH_3)_2CH_2C(CH_3)_2-$, $R_4$ is 2-ethylhexyl, $R_5$ is an alkyl radical of 14–18 carbon atoms, $n$ is a number selected from the group consisting of 0, 1, 2 and $m$ is an integer ranging from 1 to 6 and (2) water-soluble salts of said acids, said amount being a small proportion sufficient to selectively inactivate at least a major part of any carbohydrate-synthesizing enzymes present without inactivating any substantial part of the amyloglucosidase present.

3. The method according to claim 1 wherein the weight of amyloglucosidase-refining agent ranges from about 0.01 to about 0.2 part per 100 parts by weight of the aqueous amyloglucosidase preparation.

4. The method according to claim 2 wherein the weight of amyloglucosidase-refining agent ranges from about 0.01 to about 0.2 part per 100 parts by weight of the aqueous amyloglucosidase preparation.

5. The method according to claim 1 wherein the aqueous amyloglucosidase preparation is obtained from *Aspergillus phoenicis*.

6. The method according to claim 1 wherein the aqueous amyloglucosidase preparation is obtained from *Aspergillus niger*.

7. The method according to claim 1 wherein the aqueous amyloglucosidase preparation is obtained from *Aspergillus oryzae*.

8. The method according to claim 1 wherein the aqueous amyloglucosidase preparation is obtained from *Clostridium acetobutylicum*.

9. The method according to Claim 1 wherein the aqueous amyloglucosidase preparation is obtained from *Aspergillus flavus*.

10. The method of hydrolyzing to glucose in aqueous medium a carbohydrate selected from the group consisting of starch and its intermediate hydrolysis products with an amyloglucosidase preparation refined according to claim 1.

11. The method according to claim 10 wherein the amyloglucosidase preparation is refined according to claim 2.

12. The method according to claim 10 wherein the amyloglucosidase preparation is refined according to claim 3.

13. The method according to claim 10 wherein the amyloglucosidase preparation is refined according to claim 4.

No references cited.